(12) United States Patent
Roberts et al.

(10) Patent No.: US 11,487,605 B2
(45) Date of Patent: Nov. 1, 2022

(54) PREEMPTIVE SIGNAL INTEGRITY CONTROL

(71) Applicant: Advanced Micro Devices, Inc., Santa Clara, CA (US)

(72) Inventors: David A. Roberts, Boxborough, MA (US); Dean E. Gonzales, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 740 days.

(21) Appl. No.: 15/921,489

(22) Filed: Mar. 14, 2018

(65) Prior Publication Data

US 2019/0286513 A1 Sep. 19, 2019

(51) Int. Cl.
*G06F 11/07* (2006.01)
*G06F 13/376* (2006.01)

(52) U.S. Cl.
CPC ........ *G06F 11/0793* (2013.01); *G06F 11/079* (2013.01); *G06F 11/0745* (2013.01); *G06F 11/0751* (2013.01); *G06F 13/376* (2013.01)

(58) Field of Classification Search
CPC ............. G06F 11/0745; G06F 11/0751; G06F 11/079; G06F 11/0793
See application file for complete search history.

(56) References Cited

U.S. PATENT DOCUMENTS

| | | | |
|---|---|---|---|
| 6,643,787 B1* | 11/2003 | Zerbe ........................ | G06F 1/10 713/400 |
| 6,976,108 B2* | 12/2005 | Kim ...................... | G06F 13/364 710/113 |
| 2002/0184568 A1* | 12/2002 | Kurrasch ............ | G06F 11/0748 714/39 |
| 2009/0040671 A1* | 2/2009 | Zhang .................... | H02H 9/046 361/56 |
| 2010/0312522 A1* | 12/2010 | Laberge ............. | G05B 23/0227 702/184 |
| 2018/0007788 A1* | 1/2018 | Phares ............... | H01R 12/7076 |

* cited by examiner

*Primary Examiner* — Jigar P Patel

(74) *Attorney, Agent, or Firm* — Volpe Koenig

(57) ABSTRACT

Techniques are provided herein for pre-emptively reinforcing one or more buses of a computing device against the effects of signal noise that could cause a reduction in signal integrity. The techniques generally include detecting an event (or "trigger") that would tend to indicate that a reduction in signal integrity will occur, examining a reinforcement action policy and system status to determine what reinforcement action to take, and performing the reinforcement action.

20 Claims, 4 Drawing Sheets

PREEMPTIVE SIGNAL INTEGRITY CONTROL

STATEMENT REGARDING FEDERALLY SPONSORED DEVELOPMENT

This invention was made with government support under the PathForward Project with Lawrence Livermore National Security (Prime Contact No. DE-AC52-07NA27344, Subcontract No. B620717) awarded by DOE. The government has certain rights in this invention.

BACKGROUND

Computer systems include buses that carry signals between components. Such buses are subject to signal degradation. Signal degradation may come from a number of sources, such as power supply voltage fluctuations, electromagnetic cross-talk, ambient electromagnetic noise, or from other sources. Such signal degradation can lead to errors in signal transmission, ultimately resulting in reduced performance. Thus, improving signal integrity is an important task for a computer system.

BRIEF DESCRIPTION OF THE DRAWINGS

A more detailed understanding can be had from the following description, given by way of example in conjunction with the accompanying drawings wherein.

DETAILED DESCRIPTION

Figure 1:
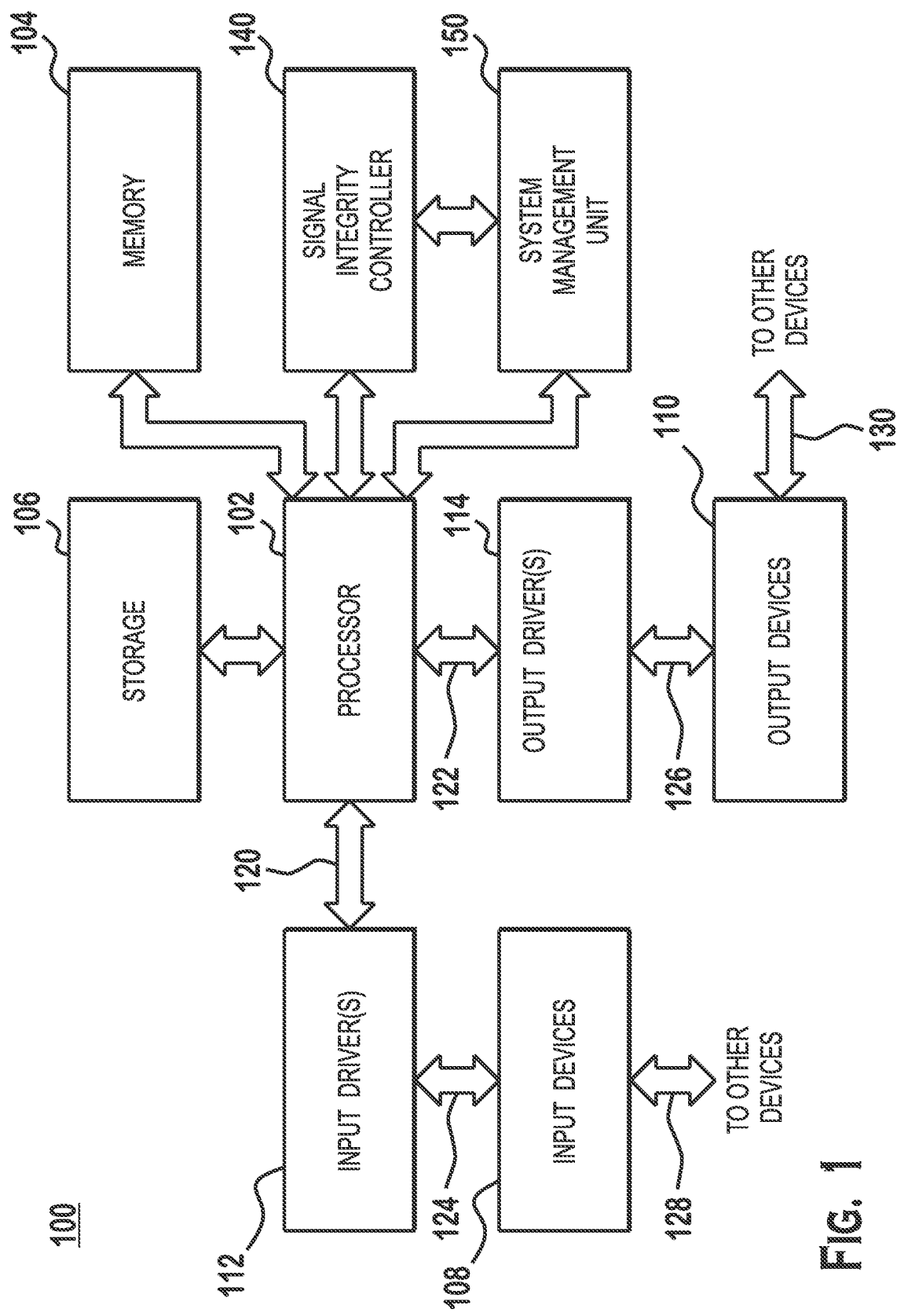
FIG. 1 is a block diagram of an example device in which one or more features of the disclosure can be implemented.

Techniques are disclosed herein for pre-emptively reinforcing one or more buses of a computing device against the effects of signal noise that could cause a reduction in signal integrity. The techniques generally include detecting an event (or "trigger") that would tend to indicate that a reduction in signal integrity will occur, examining a reinforcement action policy and system status to determine what reinforcement action to take, and performing the reinforcement action.

The triggers generally include activity within the computing device or external to the computing device that may tend to induce noise on one or more of the buses of the computing device. Some example triggers generally include activity that changes utilization of computing resources (e.g., processing resources or the like) of the computing device, requests for changes to operating characteristics (e.g., voltage, clock frequency, utilization, or the like) of one or more buses of the computing device, temperature or humidity change, or the like. Another example of a trigger includes a different computing device (or even another device that is not a computing device) informing the computing device that the different computing device experienced signal noise (manifested, for example, as an increased error rate), where the two computing devices are in close physical proximity (e.g., in the same room or within a threshold physical distance from each other). Such a notification would be useful because the fact that the other computing device experienced the signal noise indicates the existence of an effect (e.g., ambient electromagnetic interference) that could also cause signal noise on the computing device that did not yet experience the signal noise. Note, each of the above triggers is capable of acting as a predictive hint indicating that signal noise may occur at some point after actually detecting such a trigger. This allows the computing device to reinforce one or more buses determined to have a likelihood of being affected signal noise associated with the trigger.

In response to detecting the trigger, the computing device performs one or more reinforcement actions according to a reinforcement action policy. A reinforcement is an action that reinforces the bus to which it is applied against signal noise on that bus. The policy dictates what reinforcement actions are to be taken in response to which triggers, and which bus or buses the reinforcement actions are to be applied to. In determining what action to take, the computing device considers system status. The reinforcement actions that can be taken include increasing voltage of a bus, reducing clock speed of a bus, and adjusting the error code level of error correcting code of a bus. The system status includes current bus voltage level of the bus for which a reinforcement action is to be performed, bus clock frequency of the bus for which a reinforcement action is to be performed, bus error correcting code level of the bus for which a reinforcement action is to be performed, and total power utilization of the computing device or portion of the computing device. The system status determines which reinforcement actions can be taken. For example, if a maximum voltage level for a particular bus has already been reached, then, the computing device will not increase the bus voltage level further and has to perform a different reinforcement action.

After a duration that is set by the reinforcement policy and is based on which triggers occurred, or after the adverse condition that caused the trigger goes away, the computing device reverts the reinforcement action that has been performed. For example, if the voltage for a bus has been increased pursuant to a reinforcement action, then after the determined duration, or after the adverse condition that caused the trigger goes away, the computing device would reverse that reinforcement action by reducing the voltage of the bus to the voltage prior to increasing the voltage. By performing these reinforcement actions, the buses are reinforced against signal noise predicted to occur.

FIG. 1 is a block diagram of an example computing device 100 that is capable of implementing one or more features of the disclosure, according to an example. In various examples, the computing device 100 is embodied as, or is at least a portion of, a computer, a gaming device, a handheld device, a set-top box, a television, a mobile phone, or a tablet computer. The computing device 100 includes a processor 102, a memory 104, a storage 106, one or more input devices 108, and one or more output devices 110. The computing device 100 also optionally includes input drivers 112 and output drivers 114. In various examples, the computing device 100 also includes additional components not shown in FIG. 1.

In various alternatives, the processor 102 includes or is embodied as a central processing unit (CPU), a graphics processing unit (GPU), a CPU and GPU located on the same die, or one or more processor cores, wherein each processor core is a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110.

The computing device 100 includes a number of buses that communicate data either between components of the computing device 100 or from and/or to devices external to the computing device. Some examples of these buses are now described. Input driver buses 120 couple the input drivers 112 to the processor 102, allowing communication therebetween. As described above, the input driver 112 includes one or more hardware or software components that control input devices. Examples of input drivers include external communication controllers such as network interface controllers or other controllers for controlling communication to/from external computing devices of a network, as well as controllers controlling devices such as input devices like keyboards, mice, audio input devices, or the like. Output driver buses 122 couple the output driver 114 to the processor 102, allowing communication therebetween. Examples of output drivers include controllers controlling output devices such as displays, audio output devices, or the like. It should be noted that some devices perform both input and output functions. In such a situation, buses communicatively coupled to such devices would be both input driver buses and output driver buses.

Other buses are illustrated in FIG. 1, and include input device buses 124, which communicatively couple input devices 108 to input drivers 112, and output device buses 126, which communicatively couple output devices 110 to output drivers 114. Examples of other buses illustrated in FIG. 1 include output device external buses 130, which couple output devices 110 to one or more devices external to the computing device 100, and input device external buses 128, which couple input devices 110 to one or more devices external to the computing device 100. As with the output driver buses 122 and input driver buses 120, some input devices 108 are also output devices 110. For such devices, corresponding output device buses 126 would also be input device buses 124, and output device external buses 130 would also be input device external buses 128.

The buses described above are subject to signal degradation as a result of various events that may occur. Examples of such events include ambient electromagnetic noise, power fluctuations within the device, change in usage of one or more buses, change in processing workload within the computing device 100, changes in temperature or humidity in the vicinity of the computing device 100, changes in the level of cosmic ray exposure experienced by the device (e.g., traveling into outer space), or detection of a change in ambient radiation by a radiation detector device. Signal degradation may lead to errors in transmission and/or a loss in transmission bandwidth and is thus undesirable. Note, all of the buses described herein, including the input driver buses 120, the output driver buses 122, the input device buses 124, the output device buses 126, the output device external buses 130, and the input device external buses 128, may be referred to herein collectively as the term "the buses" or just "buses" herein. The term "the buses" may also refer to additional buses not listed, such as connections from a die to another element of the computer device, connections within dies, or other communication lines within or associated with the computing device 100.

A system management unit 150 is present in the computing device 100. The system management unit 150 controls operating characteristics of the buses and the processor 102, as well as other elements of the computing device 100. Such operating characteristics include power mode changes, operating voltage, clock speed, clock gating of elements of the computer device, as well as other characteristics. Although illustrated as being external to the processor 102, in some implementations, the system management unit 150 is located within the processor 102. The system management unit 150 is illustrated as being communicatively coupled to the processor 102 although it should be understood that this is just illustrative and that the system management unit 150 may alternatively or additionally be communicatively coupled to any portion of the computing device 100 to control aspects of various buses as described herein.

The present disclosure provides techniques for mitigating the effect of signal degradation by pre-emptively reinforcing one or more of the buses in response to one or more events. A signal integrity controller 140 detects triggering events and performs reinforcing actions in response to the triggering events. The signal integrity controller 140 is illustrated as being communicatively coupled to the processor 102 although it should be understood that this is just illustrative and that the signal integrity controller 140 may alternatively or additionally be communicatively coupled to any portion of the computing device 100, such as to the input drivers 112 and/or input device 108 to control and/or monitor buses of those elements. The signal integrity controller 140 is also coupled to the system management unit 150 to both read system status (e.g., system status 304 described below) and to control various aspects of the buses (e.g., voltage, clock speed, assuming those aspects are controlled by the system management unit 150) where applicable. The triggering events are events that tend to indicate a signal disturbance will occur in the future. The reinforcing actions are actions to reduce the effect of the signal disturbance on one or more buses. Additional details are provided elsewhere herein (for example, in FIG. 3).

The signal integrity controller 140 and the system management unit 150 are each implemented as software instructions executing on a processor, as fixed function hardware (e.g., a custom circuit) or as a combination of both.

Figure 2:
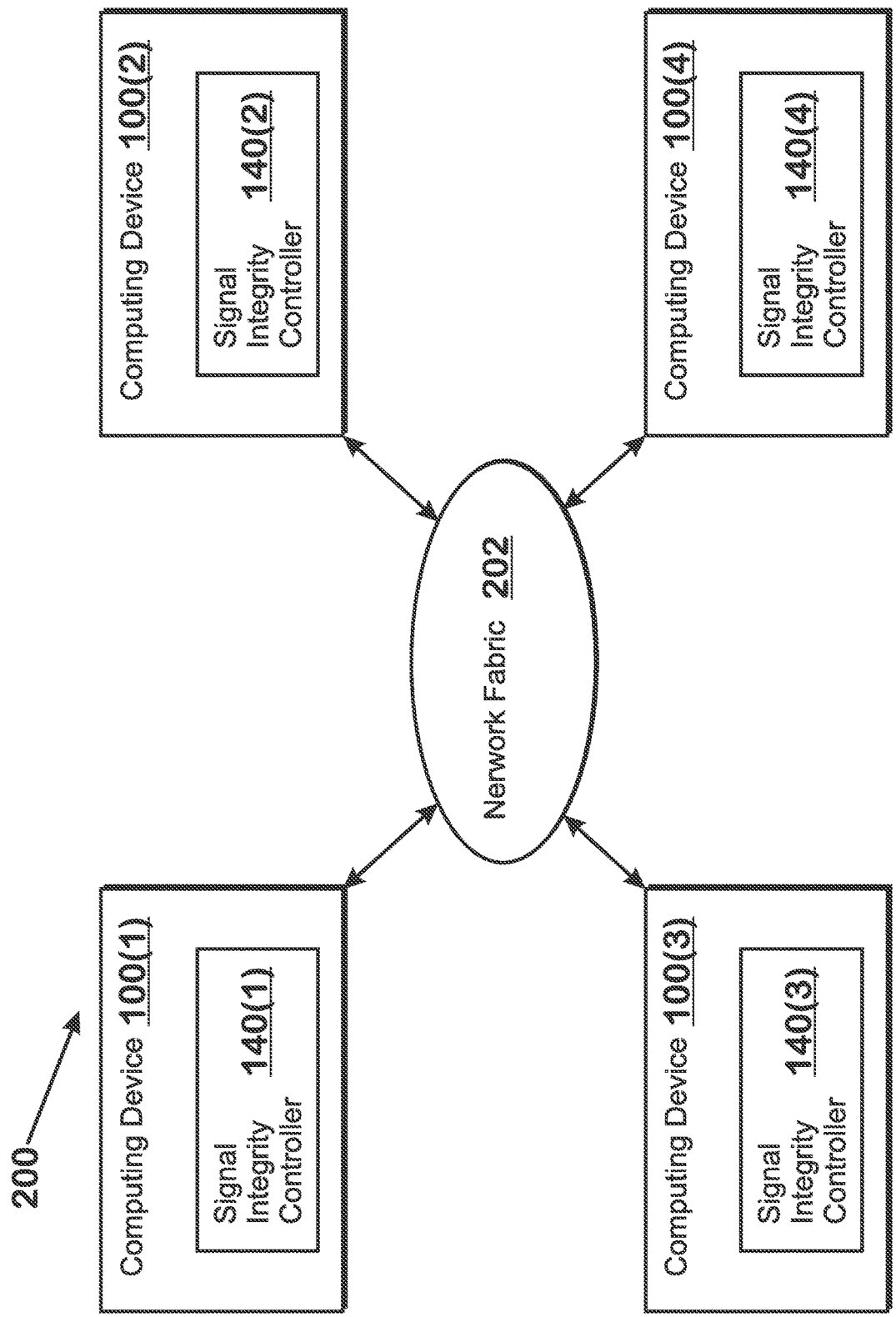
FIG. 2 is a block diagram of a networked system of computing devices, each of which includes a signal integrity controller, according to an example.

FIG. 2 illustrates a networked system of computing devices 100, each of which includes a signal integrity controller 140, according to an example. The computing devices 100 each include components such as those illustrated in FIG. 1, though it should be understood that each of the different computing devices 100 may have a differing set of components. Each of the computing devices 100 is capable of communicating with one or more of the other computing devices 100 via the network fabric 202. The network fabric 202 is any collection of network hardware, software, firmware, or other element that allows communication between the computing devices 100 in any technically feasible manner (such as a computer network based on ethernet or some other computer networking technology).

As described above, each computing device 100 has a signal integrity controller 140 that adjusts aspects of buses in response to receiving trigger events. Some trigger events are detected by the same computing device 100 as the signal integrity controller 140, and other trigger events are received from a different computing device 100, such as one coupled via the network fabric 202. Thus, it is possible for one computing device 100 to provide another computing device 100 with a signal indicating that signal degradation may occur.

Figure 3:
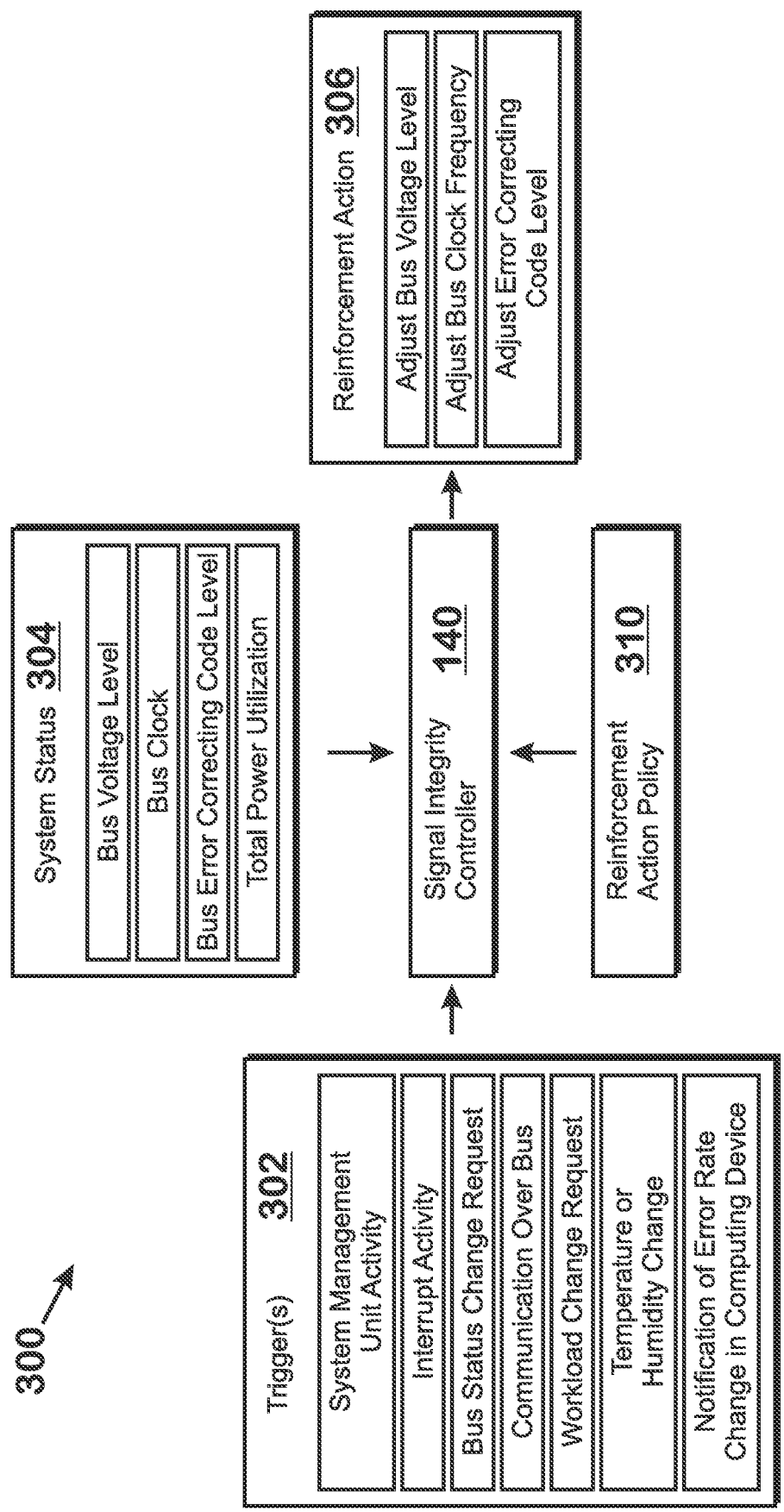
FIG. 3 illustrates aspects of a signal integrity controller, according to an example.

FIG. 3 illustrates aspects of a signal integrity controller 140, according to an example. The signal integrity controller 140 accepts triggers 302, examines system status 304, and takes one or more reinforcement actions 306 in response.

The triggers 302 include: activity by the system management unit 150, interrupt activity, a bus status change request, communication occurring over a bus, a workload change request, a temperature or humidity change, and a notification of an error rate change in a signal integrity controller 140 at a different computer device 100.

The activity by the system management unit 150 includes the system management unit 150 performing various actions to control operations on the computing device 100. Examples of such actions include changing power gating status for one or more portions of the electronic device 100 (e.g., switching a core of the processor 102 on or off via clock gating), changing the clock frequency of one or more elements of the computing device 100, changing the power supply voltage supplied to one or more elements of the computing device 100, or changing some other power state for one or more elements of the computing device 100. Any of the above activities could cause a transient voltage drop at one or more parts of the computing device 100, or could trigger other effects that could reduce the signal integrity on one of the buses of the electronic device 100, which is why such an activity has the capability to cause the signal integrity controller 140 to perform a reinforcement action.

The interrupt activity includes receiving a notification that a particular interrupt is occurring, or otherwise determining that a particular interrupt is to occur at a particular time. Thus, particular interrupts act as a trigger to the signal integrity controller 140 to perform a reinforcement action. One interrupt that is capable of acting as a trigger is the interrupt generated by an interrupt controller to cause the operating system ("OS") executing on the processor 102 to perform a context switch. More specifically, operating systems typically include a scheduler component that periodically switches control between different programs or threads. The scheduler component is triggered by periodically generated interrupts. Upon receiving such an interrupt, the scheduler assumes control of the processor and determines which thread to execute next. Part of this operation includes determining whether new computing resources need to be activated because the amount of demand for processing resources has increased. Activating new computer resources could draw further on the power supply of the computer device 100, which could cause a transient voltage drop, thereby reducing signal integrity on one or more of the buses. For this reason, an interrupt to trigger an OS scheduler is one of the trigger events that could cause the signal integrity controller 140 to perform one or more reinforcement actions. Other interrupts, besides those that trigger the OS scheduler, could act as a trigger to the signal integrity controller 140 as well.

The bus change status request includes a request to change aspects of one or more of the buses. These aspects include features such as the clock frequency, voltage, or other power-related aspect of a bus. A request to change such features could cause interference with one or more buses of the computing device 100, which could degrade system integrity. Thus, such a request, when detected by the signal integrity controller 140, could act as a trigger to cause the signal integrity controller 140 to perform a reinforcement action. Note, the bus on which the change occurs does not need to be the same bus as the bus on which the reinforcement action occurs.

Communication over a bus includes transmission or receipt or both of communication over one or more of the buses. In some implementations, the buses which, when communication occurs over them, act as a trigger, are limited to those over which communication is not constant or is infrequent as compared with other buses. One example of such a bus is the external communication link for a network interface controller. This link is the link over which the network interface controller communicates with other computing devices over a network (such as network fabric 202). Thus, when the network interface controller is about to transmit a network packet, or when the network interface controller receives an indication that it is about to receive another packet (for example, receiving a portion of one packet may indicate that additional packets are incoming), the signal integrity controller 140 receives an indication that such an event is occurring. In some situations, that indication acts as a trigger to perform a reinforcement action.

A workload change request includes a request by an element of the computing device 100 to change the workload being performed by processing units of the computing device 100. Any such workload change request could cause interference on one or more of the buses. For example, an increase in workload being performed could cause a processing unit such as a core of the processor 102 to be powered on, which would result in increased power draw and a transient voltage drop within the computing device 100. This transient voltage drop could cause signal degradation on one or more of the buses. Thus, in response to receiving an indication that a workload change request is occurring, the signal integrity controller 140 may perform a reinforcement action.

A temperature or humidity change may cause signal degradation on one or more of the buses. Therefore, when the signal integrity controller 140 detects a change in humidity or temperature (i.e., through one or more sensors, not shown), in some situations, such a detection acts as a trigger to perform a reinforcement action.

A notification of error rate change in another computing device includes a notification, from another computing device 100, that an error rate change has occurred in that other computing device 100. An error rate is measured in various buses. One mechanism for measuring error (which is also a mechanism for correcting errors) is error correcting code ("ECC"). When a component for managing ECC on one computing device detects an increase in measured error (i.e., number or rate of observed errors), that computing device 100 notifies the signal integrity controller 140 of one or more other computing devices 100 of such a change in measured error. The computing device 100 receiving this notification is capable of using this notification as a trigger to perform a reinforcement action. The rationale behind such a scheme is that if one computing device 100 detects an increase in measured error, it is likely that some effect has caused that measured error to increase. That effect may be electromagnetic noise or some other effect that would lead to reduced signal integrity. That same effect could cause a reduction in signal integrity a different computing device 100. Thus, the computing device 100 that detects the effect sends a notification to a different computing device 100, which is then capable of using that notification to perform a reinforcement action.

In the present description, it is sometimes stated that an entity "performs a reinforcement action." This statement, or similar statements, means that the entity performs an action to reinforce a bus against signal noise, such as one of the reinforcement actions 306 described herein.

The reinforcement actions 306 include adjusting the bus voltage level, adjusting the bus clock, and adjusting the error correcting code level. The bus voltage level includes the voltage for signals being transmitted over the bus. Increasing this voltage reduces the effect of signal noise on the bus.

Adjusting the bus clock frequency also mitigates the effect of signal noise on a bus. More specifically, a lowered clock frequency stabilizes the signal, bracing the signal against noise.

Adjusting the error correcting code level also is able to mitigate the effects of signal noise. The "level" of the ECC refers to the strength of the protection. In some examples, ECC uses ECC bits to check and potentially correct errors in a signal. A greater ECC protection utilizes a greater number of ECC bits. Thus, strengthening the level of ECC involves increasing the number of ECC bits used, which can reinforce against increased signal noise that would lead to data errors. A greater ECC protection may also use a different ECC encoding as well.

The system status 304 includes bus voltage level, bus clock, bus error correcting code level, and total power utilization. These elements of status inform what reinforcement actions can or should be taken in response to a trigger 302. There are a lot of ways in which the signal integrity controller 140 takes system status 304 into consideration in determining which reinforcement action to take. Some such ways include system status limiting what particular actions can be taken, or system status informing a decision based on priority.

In one example, bus voltage level has reached a maximum, so increasing voltage on the bus would be impossible. In this situation, the signal integrity controller 140 takes a reinforcement action other than increasing the bus voltage. In other examples, bus clock frequency has reached a minimum, so the signal integrity controller 140 takes an action other than adjusting the bus clock frequency, or the ECC level has reached a maximum, so the signal integrity controller 140 takes an action other than adjusting the ECC level. In yet another example, total power utilization has reached a total power budget, so that a reinforcement action that increases power draw (such as increasing bus voltage) cannot be taken. In that situation, a different reinforcement action would occur.

In some implementations, the reinforcement actions 306 are prioritized. Prioritizing reinforcement actions means that the signal integrity controller 140 performs a particular reinforcement action 306 with a higher priority instead of another reinforcement action 306 with a lower priority, if possible. In one example of priority, adjusting bus voltage level has the highest priority, followed by adjusting bus clock frequency, and then followed by adjusting ECC level. The rationale behind such a priority ordering is that adjusting the voltage level only affects power draw, but does not impact performance. Adjusting the bus clock frequency impacts performance (e.g., bandwidth) but does not require additional processing. Adjusting the ECC level both impacts performance (e.g., bandwidth, by reserving additional bits to the ECC coding) and requires additional processing. Any other prioritization, as well as no prioritization, is possible as well.

The signal integrity controller 140 has an associated reinforcement action policy 310 that dictates the manner in which the signal integrity controller 140 perform reinforcement actions 306 in response to the triggers 302 and system status 304. In addition to what reinforcement actions 306 to take, the policy 310 also indicates the duration of such reinforcement actions 306, where such duration is defined for different events, as described elsewhere herein. In some implementations, the policy 310 also indicates which buses to apply the reinforcement actions 306 to, in response to which specific triggers 302 occur.

Note that use of the triggers to decide to perform one or more reinforcement actions is a form of pre-emptive remedial action. In other words, the triggers 302 include events that would tend to indicate that signal disturbance may or will occur on one or more buses of a computing device 100 after the event is detected. In other words, it is possible for the actual effect that causes signal interference to occur after the trigger(s) 302 are detected by the signal integrity controller 140. Of course, it is also possible that signal interference occurs approximately at the same time as, or before, the corresponding trigger 302 is detected by the signal integrity controller 140. Further, because the triggers 302 may be considered "hints" that signal that interference may occur in the future, it is even possible for no interference to occur after a particular trigger 302 is signaled to the signal integrity controller 140.

The reinforcement actions 306 performed by the signal integrity controller 140 have associated durations. The duration for any particular reinforcement action is dependent on the type of reinforcement action and/or the type of trigger that triggers the reinforcement action, and may also be dependent on the priority of the data being communicated, with a higher priority being associated with a greater duration and a lower priority being associated with a lower duration (i.e., some transmissions over a bus are sent with a "high" priority and others are sent with a "lower" priority).

Some durations are based on a timeout mechanism, with reinforcement actions having a timeout mechanism being sustained for a pre-specified period of time and then being reverted. In one example, the signal integrity controller 140 of one computing device 100 performs a reinforcement action in response to detecting that a communication over the bus, specifically, a network packet being transmitted to another computing device 100, is going to occur. The network interface controller is able to inform the signal integrity controller 140 both when the transmission will begin and when the transmission will end. Thus, the signal integrity controller 140 performs the reinforcement action for the period between when the transmission begins and ends. After the transmission ends, the signal integrity controller 140 reverts the reinforcement action (for example, if the reinforcement action is to increase bus voltage, then reverting the reinforcement action would be reducing the bus voltage back to the voltage prior to increasing the bus voltage).

In another example, the signal integrity controller 140 of a computing device 100 receives a notification that an event is going to occur, where the event is associated with a known or estimated duration of signal interference. In one example, the signal integrity controller 140 receives a notification from an interrupt controller that the interrupt controller is going to generate an interrupt triggering the operating system to execute a scheduler. In response, the signal integrity controller 140 performs a reinforcement action for a set duration (a duration associated with an estimated duration of signal noise that would occur when the OS scheduler executes and potentially changes processing resource utilization, resulting in signal noise on one or more buses) and then reverts the reinforcement action. Herein, reverting the reinforcement action after a set duration is referred to as "duration-driven reversion" and reverting the reinforcement action after a particular event is complete will be referred to as "event completion-driven reversion." The type of reversion (duration-driven or event-driven) is referred to herein as a "reversion mode."

Figure 4:
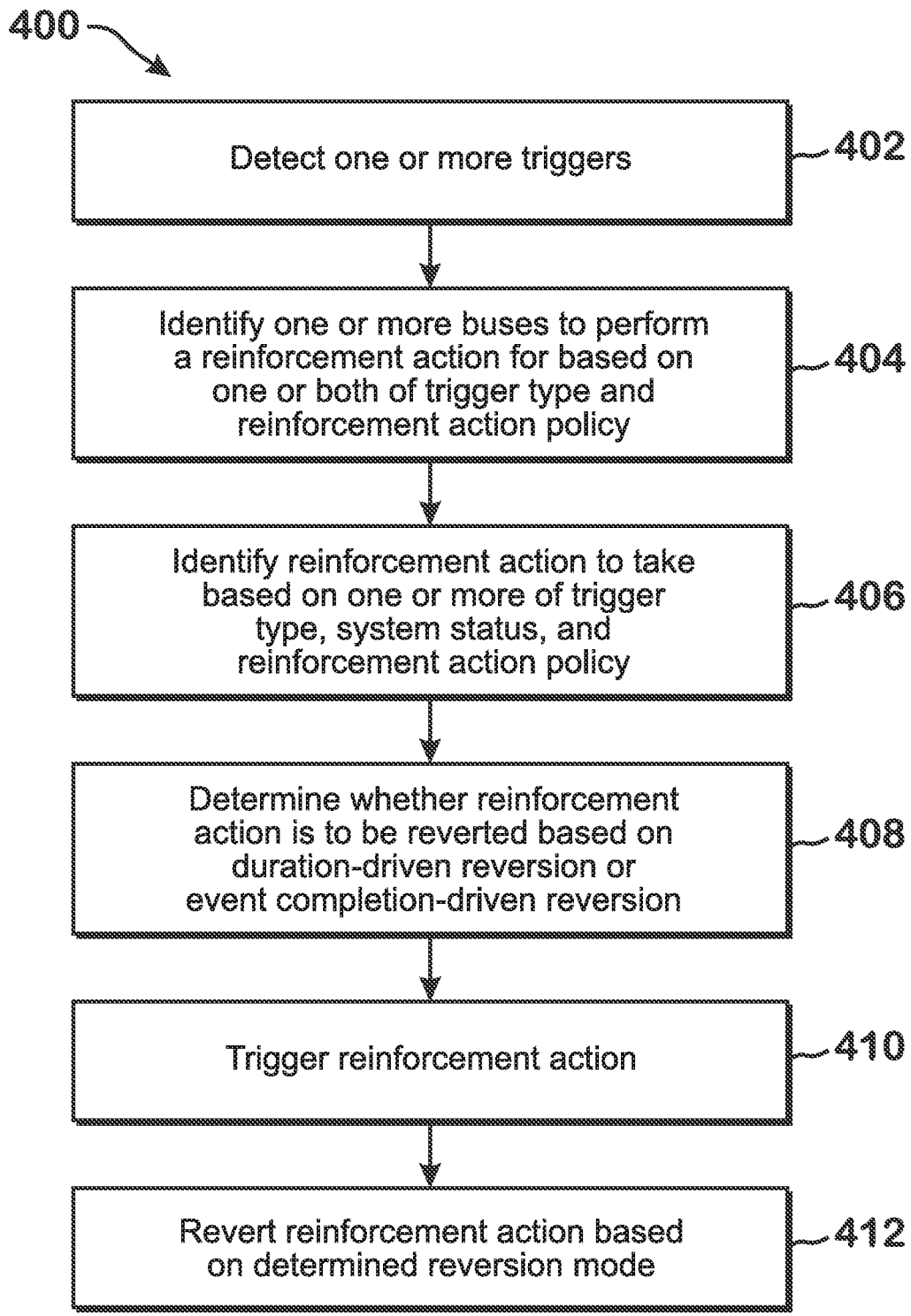
FIG. 4 is a flow diagram of a method for reinforcing one or more buses of a computing device in response to a triggering event, according to an example.

FIG. 4 is a flow diagram of a method 400 for reinforcing one or more buses of a computing device 100 in response to a triggering event, according to an example. Although described with respect to the system of FIGS. 1-3, it should be understood that any system capable of performing the method 400 in any technically feasible order could alternatively perform the method 400.

As shown, the method 400 begins at step 402, wherein the signal integrity controller 140 of a computing device 100 detects one or more triggers 302. The triggers 302 could be one or more of any of the triggers described elsewhere herein, such as system management unit activity (e.g., change in utilization of processing or other resources that would result in a change in power drawn from a power source), interrupt activity (which could include any interrupt activity that would result in signal noise experienced by one or more buses—one example includes a timing interrupt that triggers an OS scheduler, which could result in additional processing resources being utilized due to a new thread or application being scheduled, thereby resulting in a change in power drawn from a power source and/or another source of signal noise experienced on one or more buses), a bus status change request (which includes, for example, a request by a component of the computing device 100 to change the status, such as voltage level, clock frequency, ECC level, or other aspect of one or more buses of the computing device 100, which could result in a disturbance within the computing device 100 and thus signal noise on one or more of the buses), communication over a bus (which could result in signal noise over other buses due to cross-talk), a workload change request for one or more processing components of the computing device 100 (which could result in a change in power drawn from a power source, thereby inducing noise on one or more buses of the computing device 100, a temperature or humidity change, or a notification of an error rate change in a different computing device 100 (which could be a hint that some event is occurring that could induce signal noise in one or more buses of the computing device 100 on which the method 400 is occurring).

At step 404, in response to the one or more triggers, the signal integrity controller 140 identifies one or more buses on which to perform a reinforcement action. This identification is made based on one or both of the trigger type and the reinforcement action policy 310.

At step 406, the signal integrity controller 140 identifies the reinforcement action to take based on one or more of the trigger type, the system status 304, and the reinforcement action policy 310. The reinforcement action policy 310 indicates what reinforcement actions to take based on these factors. The system status 304 indicates what actions can be taken. For example, if the bus voltage level of the bus for which a reinforcement action is to be taken is already at maximum voltage, then a reinforcement action to increase the bus voltage cannot be taken. The reinforcement action policy 310 indicates priority of reinforcement action based on the system status 304, as described elsewhere herein.

At step 408, the signal integrity controller 140 determines whether the reinforcement action is to be reverted based on a duration-driven reversion or an event completion-driven reversion. This determination is based on the reinforcement action policy 310, which specifies the reversion mode that should occur for any particular trigger.

At step 410, the signal integrity controller 140 triggers the reinforcement action, which includes performing the identified action for the identified one or more buses. At step 412, the signal integrity controller 140 reverts the reinforcement action based on the determined reversion mode. As described elsewhere herein, reversion includes "resetting" or reversing the effect of the reinforcement action previously applied.

Although some example buses are described, it should be understood that the techniques described herein can be applied to any bus of the computing device 100.

One specific configuration in which the techniques disclosed herein can be used is now provided. In this configuration, the buses for which reinforcement actions are applied are external input/output buses that link a computing device 100 to another device (e.g., through a connection such as Ethernet, high definition multimedia interface ("HDMI"), RS232 serial, or any other connection type). Upon receiving one or more triggers 302, the signal integrity controller 140 performs one or more reinforcement actions for one or more of the external input/output buses, based on the reinforcement action policy 310 and the system status 304. In this configuration, buses other than the external input/output buses do not have reinforcement actions applied.

A method for pre-emptively reinforcing one or more buses of a computing device against signal noise is provided. The method includes detecting a triggering event that is predictive of signal noise occurring on one or more buses of the computing device, identifying one or more buses of the computing device on which to perform a reinforcement action to reinforce against signal noise, based on a reinforcement action policy and a type of the triggering event, identifying one or more reinforcement actions to be taken based on the reinforcement action policy, the type of the triggering event, and a system status of the computing device, and performing the reinforcement action on the identified one or more buses.

A computing device for pre-emptively reinforcing one or more buses of a plurality of buses of the computing device against signal noise is provided. The computing device includes the plurality of buses and a signal integrity controller. The signal integrity controller detects a triggering event that is predictive of signal noise occurring on the one or more buses, identifies one or more buses of the plurality of buses on which to perform a reinforcement action to reinforce against signal noise, based on a reinforcement action policy and a type of the triggering event, identifies one or more reinforcement actions to be taken based on the reinforcement action policy, the type of the triggering event, and a system status of the computing device, and perform the reinforcement action on the identified one or more buses.

A non-transitory computer-readable medium storing instructions that, when executed by a processor, cause the processor to pre-emptively reinforce one or more buses of a computing device against signal noise is provided. Pre-emptively reinforcing the one or more buses of the computing device against signal noise is performed by detecting a triggering event that is predictive of signal noise occurring on one or more buses of the computing device, identifying one or more buses of the computing device on which to perform a reinforcement action to reinforce against signal noise, based on a reinforcement action policy and a type of the triggering event, identifying one or more reinforcement actions to be taken based on the reinforcement action policy, the type of the triggering event, and a system status of the computing device, and performing the reinforcement action on the identified one or more buses.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for pre-emptively reinforcing one or more buses of a computing device against signal noise, the method comprising:
   detecting a triggering event that is predictive of signal noise occurring on one or more buses of the computing device;
   identifying one or more buses of the computing device on which to perform a reinforcement action to reinforce against signal noise, based on a reinforcement action policy and a type of the triggering event;
   identifying one or more reinforcement actions to be taken based on the reinforcement action policy, the type of the triggering event, and a system status of the computing device; and
   performing the reinforcement action on the identified one or more buses.

2. The method of claim 1, further comprising:
   reverting the reinforcement action after a determined duration.

3. The method of claim 2, wherein the determined duration is one of a duration-driven reversion or an event completion-driven reversion.

4. The method of claim 3, further comprising determining whether the duration is a duration-driven reversion or an event completion-driven reversion based on the type of the trigger.

5. The method of claim 1, wherein the triggering event comprises one or more of system management unit activity, interrupt activity, a bus status change request, communication over a bus, a workload change request, a temperature or humidity change, or a notification of an error rate change in a second computing device.

6. The method of claim 1, wherein the reinforcement action comprises one or more of increasing the voltage of a bus, reducing the clock frequency of a bus, or increasing the error correcting code level of the bus.

7. The method of claim 1, wherein the one or more identified buses are identified from a group of external buses that couple the computing device to a device external to the computing device.

8. The method of claim 1, wherein identifying the one or more reinforcement actions based on the system status comprises determining whether an aspect of system status has reached a bound and not performing a reinforcement action for an aspect of system status for which the bound has been reached.

9. The method of claim 1, wherein the reinforcement actions are prioritized.

10. A computing device for pre-emptively reinforcing one or more buses of a plurality of buses of the computing device against signal noise, the computing device comprising:
    the plurality of buses, including the one or more buses; and
    a signal integrity controller configured to:
      detect a triggering event that is predictive of signal noise occurring on the one or more buses;
      identify one or more buses of the plurality of buses on which to perform a reinforcement action to reinforce against signal noise, based on a reinforcement action policy and a type of the triggering event;
      identify one or more reinforcement actions to be taken based on the reinforcement action policy, the type of the triggering event, and a system status of the computing device; and
      perform the reinforcement action on the identified one or more buses.

11. The computing device of claim 10, wherein the signal integrity controller is further configured to:
    revert the reinforcement action after a determined duration.

12. The computing device of claim 11, wherein the determined duration is one of a duration-driven reversion or an event completion-driven reversion.

13. The computing device of claim 12, wherein the signal integrity controller is configured to determine whether the duration is a duration-driven reversion or an event completion-driven reversion based on the type of the trigger.

14. The computing device of claim 10, wherein the triggering event comprises one or more of system management unit activity, interrupt activity, a bus status change request, communication over a bus, a workload change request, a temperature or humidity change, or a notification of an error rate change in a second computing device.

15. The computing device of claim 10, wherein the reinforcement action comprises one or more of increasing the voltage of a bus, reducing the clock frequency of a bus, or increasing the error correcting code level of the bus.

16. The computing device of claim 10, wherein the one or more identified buses are identified from a group of external buses that couple the computing device to a device external to the computing device.

17. The computing device of claim 10, wherein the signal integrity controller is further configured to identify the one or more reinforcement actions based on the system status by determining whether an aspect of system status has reached a bound and not performing a reinforcement action for an aspect of system status for which the bound has been reached.

18. The computing device of claim 10, wherein the reinforcement actions are prioritized.

19. A non-transitory computer-readable medium storing instructions that, when executed by a processor, cause the processor to pre-emptively reinforce one or more buses of a computing device against signal noise, by:
   detecting a triggering event that is predictive of signal noise occurring on one or more buses of the computing device;
   identifying one or more buses of the computing device on which to perform a reinforcement action to reinforce against signal noise, based on a reinforcement action policy and a type of the triggering event;
   identifying one or more reinforcement actions to be taken based on the reinforcement action policy, the type of the triggering event, and a system status of the computing device; and
   performing the reinforcement action on the identified one or more buses.

20. The non-transitory computer-readable medium of claim 19, wherein:
   the triggering event comprises one or more of system management unit activity, interrupt activity, a bus status change request, communication over a bus, a workload change request, a temperature or humidity change, or a notification of an error rate change in a second computing device; and
   the reinforcement action comprises one or more of increasing the voltage of a bus, reducing the clock frequency of a bus, or increasing the error correcting code level of the bus.

* * * * *